(12) United States Patent
Ejima et al.

(10) Patent No.: US 6,327,423 B1
(45) Date of Patent: *Dec. 4, 2001

(54) INFORMATION PROCESSING APPARATUS AND RECORDING MEDIUM

(75) Inventors: Satoshi Ejima, Tokyo; Akira Ohmura, Kawasaki; Akihiko Hamamura, Chiba, all of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,198

(22) Filed: Nov. 6, 1997

Related U.S. Application Data

(60) Provisional application No. 60/052,340, filed on Jul. 11, 1997.

(30) Foreign Application Priority Data

Apr. 18, 1997 (JP) .................................................... 9-101273

(51) Int. Cl.[7] .................................................. H04N 5/928
(52) U.S. Cl. .............................................. 386/96; 386/106
(58) Field of Search ................................ 386/46, 96, 104, 386/109, 106, 107, 117, 121; 358/906, 909.1; H04N 5/928, 5/225

(56) References Cited

U.S. PATENT DOCUMENTS

| | | | |
|---|---|---|---|
| 5,081,538 * | 1/1992 | Takei et al. .......................... | 386/105 |
| 5,452,145 * | 9/1995 | Wakui et al. ......................... | 386/106 |
| 5,648,760 | 7/1997 | Kumar . | |
| 5,867,628 * | 2/1999 | Sato et al. ............................ | 386/106 |

FOREIGN PATENT DOCUMENTS

| | | | |
|---|---|---|---|
| 2-280478 * | 11/1990 | (JP) .............................. | H04N/5/781 |
| 3-44173A * | 2/1991 | (JP) .............................. | H04N/5/225 |

* cited by examiner

*Primary Examiner*—Huy Nguyen
(74) *Attorney, Agent, or Firm*—Oliff & Berridge, PLC

(57) ABSTRACT

An information processing apparatus allows the change of sound recording time as needed using a simple operation. The information processing apparatus allows shooting and sound recording to be executed simultaneously. When a release switch is pressed, a photo image of an object entering from a shooting lens is converted by a Charge Coupled Device to electrical signals. A predetermined process is executed on the electrical signals, and the results are stored in memory. Sound signals that are output from a microphone are analog/digital converted and the results are successively stored in the memory. Furthermore, if a predetermined period of time has elapsed after pressing the release switch, the sound recording process is ended. If a sound recording switch is pressed between the pressing of the release switch and the elapse of the predetermined period of time, the sound recording process continues. If the sound recording switch is pressed again, the process is ended.

23 Claims, 14 Drawing Sheets

INFORMATION PROCESSING APPARATUS AND RECORDING MEDIUM

RELATED PROVISIONAL APPLICATION

This nonprovisional application claims the benefit of Provisional Application No. 60/052,340, filed Jul. 11, 1997.

INCORPORATION BY REFERENCE

The disclosure of the following priority application be herein incorporated by reference: Japanese Patent Application No. 9-101273, filed Apr. 18, 1997.

BACKGROUND OF THE INVENTION

1. Field of Invention

The present invention relates to an information processing apparatus, and in particular, it relates to an information processing apparatus capable of recording a photographic image of an object as well as sound.

2. Description of the Related Art

Development of smaller semiconductors and the progress of mounting technologies have contributed to the development of electronic cameras capable of recording sound in addition to the images of an object. Such electronic cameras have been available in the marketplace in recent years.

However, because sound comprises time-related information and images comprise space-related information, when recording sound it becomes necessary to designate the start of recording and end of recording. For example, when recording images and sound simultaneously, the recording of a photo image of an object at the time a release switch is pressed is all that is required for an image, but the designation of the timing of the ending of the recording is also required for sound.

Therefore, the simultaneous recording of image and sound becomes possible, for example, by creating a device in which the recording of sound begins as soon as the shooting is executed and the recording of sound is ended when a predetermined operation is executed. However, such a device presents the problem that the operation to end the recording of sound must be executed for each shooting to complete the operation.

In order to resolve the problem described above, a device is suggested, for example, in which the recording of sound is executed only for a predetermined time (for example, 10 seconds) while recording the photo image of the object when the release switch is pressed, which eliminates the need to execute an operation to end the recording of the sound.

However, such a device presents the problem that the recording of sound for longer than 10 seconds (or some other predetermined time) is not possible. Once shooting begins, the recording of sound is always enabled for 10 seconds, which makes it impossible to execute shooting in an unexpected situation during the recording of sound, hence a shooting opportunity may be lost.

SUMMARY OF THE INVENTION

Considering the problems described above, the present invention makes it possible for an electronic camera that is capable of recording images and sound simultaneously to easily change the timing of ending the recording of sound, without making the operation complicated.

The information processing apparatus according to a preferred embodiment of the invention includes a still image recording means for recording still images when a first control member is operated, a sound recording means for recording sound for only a predetermined time after the operation of the first control member, a detection means for detecting the operation of a second control member, and a recording time alteration means for changing the recording time of the sound recording means. If, and therefore when, the operation of the second control member is detected, the recording time alteration means changes the recording time as a function of the operation of the second control member.

According to another aspect of the invention, a recording medium for use in an information processing apparatus capable of recording images and sound, is encoded with a control program that causes the information processing apparatus to record only a still image when a first control member is operated, record only sound for a predetermined time after the operation of the first control member, detect the operation of a second control member, and when the operation of the second control member is detected within the predetermined time after operation of the first control member, change the predetermined sound recording time as a function of the operation of the second control member.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Embodiments of the present invention are described hereafter, with reference to the drawings.

Figure 1:
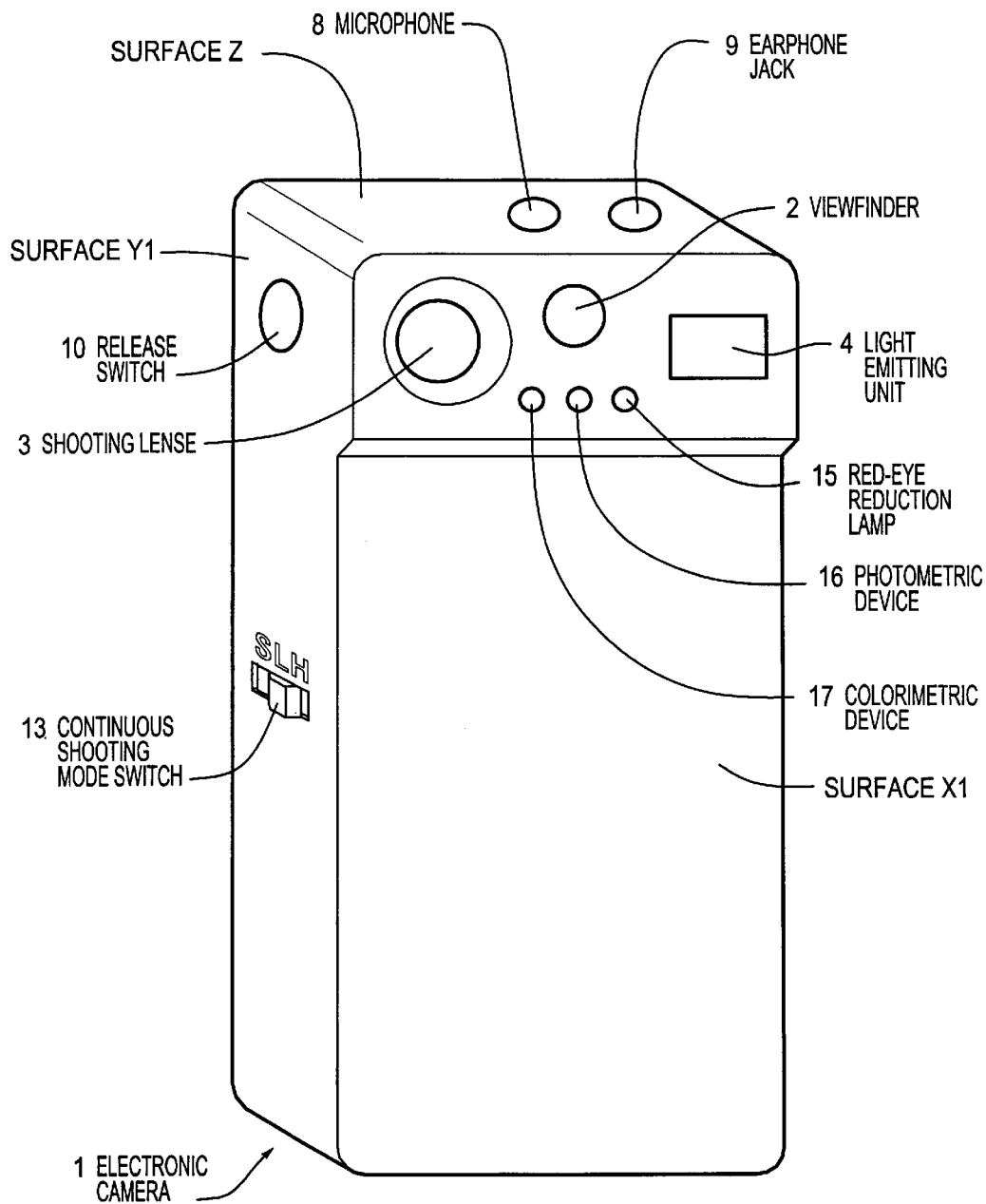
FIG. 1 is a front perspective view of an embodiment of an electronic camera according to the present invention.
Figure 2:
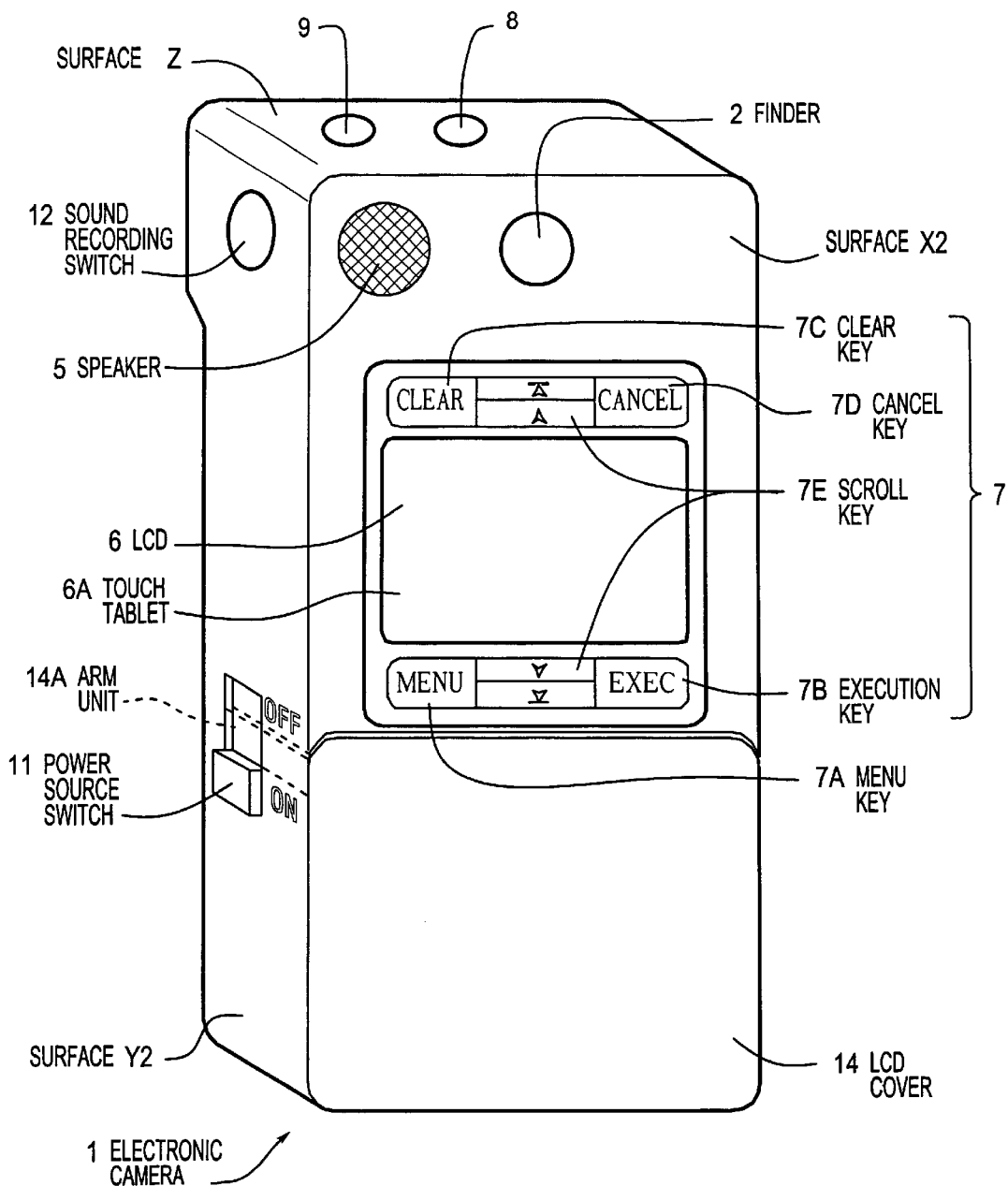
FIG. 2 is a rear perspective view of the electronic camera shown in FIG. 1.

FIGS. 1 and 2 are perspective views showing an embodiment of an electronic camera according to the present invention. The surface of the camera facing the object is defined as the surface X1 and the surface facing the user is defined as the surface X2 when the object is photographed. As shown in FIG. 1, the top edge section of the surface X1 includes a viewfinder 2, which is used to verify the shooting range of the object, a shooting lens 3, which takes in the optical image of the object, and a light emitting unit (strobe) 4, which emits light to illuminate the object.

On the surface X1, a photometric device 16 measures light during the time when the operation of a red-eye reduction lamp 15 reduces red eye by emitting light before causing the strobe 4 to emit light and CCD 20 (a Charge Coupled Device that is part of the still image recording means) is prevented from operating with the strobe 4 emitting light. Other photoelectric conversion devices could be used as alternatives to CCD 20 for converting a light image of an object to electrical signals. Alternatives could include, for example, CMOS devices and PSDs (Photo-Sensitive Diodes). A calorimetric device 17 measures color during the time when operation of CCD 20 is stopped.

As shown in FIG. 2, the top edge section of the surface X2 (a position opposite from the top section of the surface X1 where the viewfinder 2, the control lens 3 and the light emitting unit 4 are formed) includes the viewfinder 2 and a speaker 5 that outputs the sound being recorded in the electronic camera 1. A liquid crystal display (LCD) 6 and a group of keys that together make up control keys 7 are positioned on the surface X2 vertically below the viewfinder 2, and the speaker 5. The LCD 6 (display component) could be any type of flat screen display and could be provided on the body of electronic camera 1, as shown in FIG. 2, or could be a separate (i.e., removable) component. As a separate component, the display component could be a CRT monitor and could be part of a personal computer or other host apparatus. A touch tablet 6A is arranged on the surface of the LCD 6. Touch tablet 6A outputs position data corresponding to a position designated by a touching operation of a pen type pointing device, which will be explained later.

The touch tablet 6A is made of transparent material such as glass or resin and the user may be able to view an image displayed on LCD 6, which is positioned inside the touch tablet 6A through the touch tablet 6A.

The group of keys that together make up control keys 7 are operated in reproducing and displaying the recording data on the LCD 6. Control keys 7 detect an operation (input) by the user and supply the user's input to a CPU 39, shown in FIG. 6. The CPU 39 includes detection means, and sound recording time alteration means to be explained later. The CPU 39 could be any type of processor including a microprocessor, as is common in electronic digital still and/or video cameras.

A menu key 7A is operated to display a menu screen on the LCD 6. An execution key 7B is operated to reproduce the recording information selected by the user.

A clear key 7C is operated to delete the recorded information. A cancel key 7D is operated to interrupt the reproduction process of the recording information. A scroll key 7E is operated to scroll the screen vertically when the recording information is displayed on the LCD 6 as a table.

Figure 3:
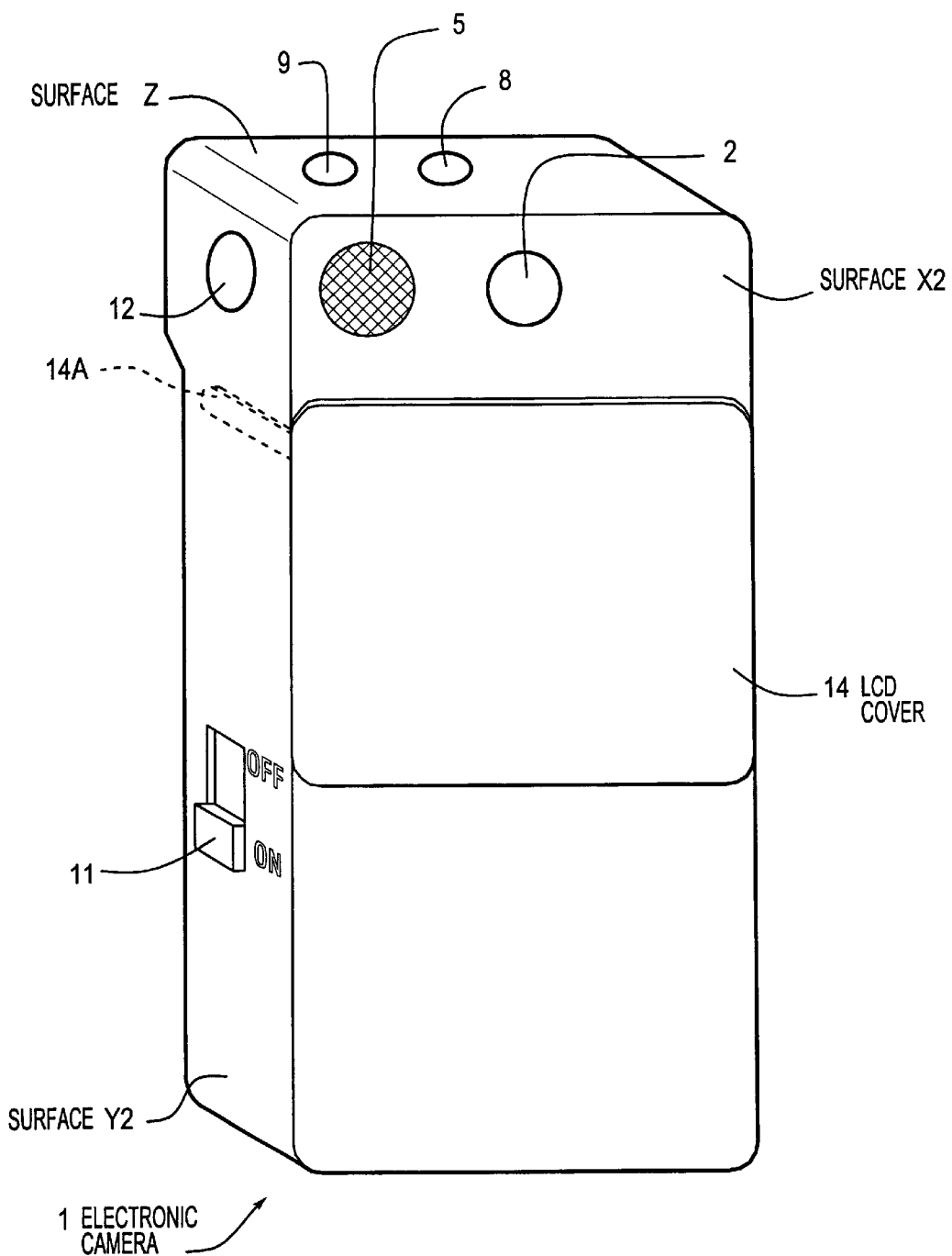
FIG. 3 is a rear perspective view of the electronic camera of FIG. 1 with a cover being closed over the liquid crystal display.
Figure 5A:
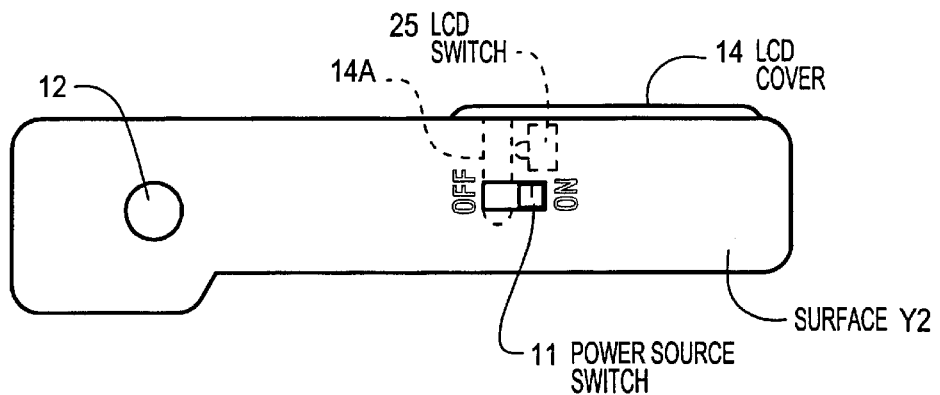
FIGS. 5A, 5B and 5C are side views of the camera show in FIG. 2, illustrating a relationship between the position of a LCD cover, a power source switch and a LCD switch.
Figure 5B:
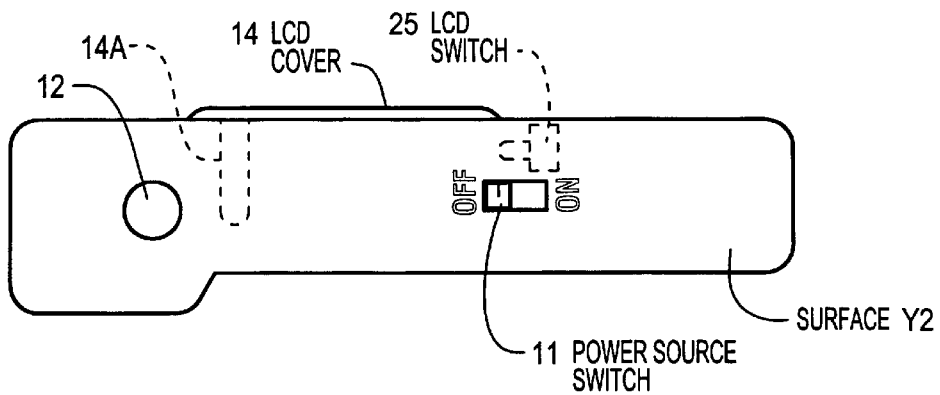
Figure 5C:
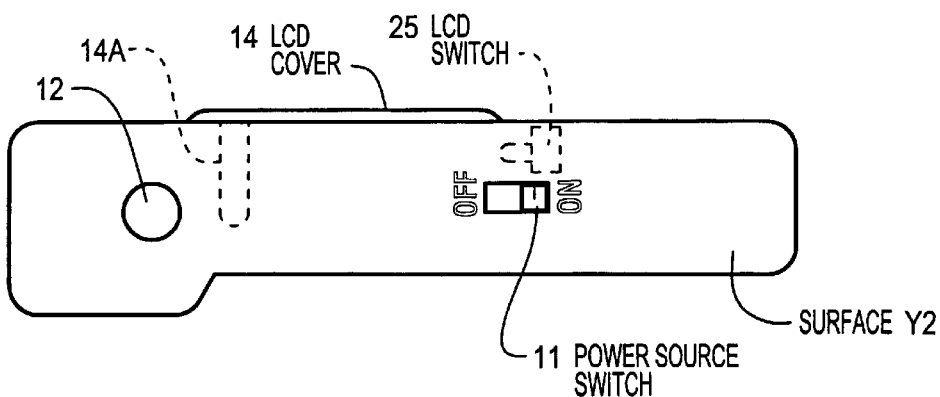

An LCD cover 14 is mounted to slide freely on the surface X2, and provides means for protecting the LCD 6 when it is not in use. When moved upward in the vertical direction, the LCD cover 14 covers the LCD 6 and the touch tablet 6A as shown in FIG. 3. When the LCD cover 14 is moved downward in the vertical direction, the LCD 6 and the touch tablet 6A are exposed, and a power switch 11 (to be explained later) arranged on a side surface Y2 of camera 1 is switched to the on-position by an arm unit 14A of the LCD cover 14, as shown in FIGS. 5A–5C.

A microphone 8 (sound recording means) to gather sound and an earphone jack 9 (to which an unrepresented earphone is connected) are provided on a top surface Z of the electronic camera 1.

A release switch 10 is operated in shooting an object, and a continuous shooting mode switch 13 is operated in switching the continuous shooting mode during shooting. The release switch 10 and continuous shooting mode switch 13 are provided on the left side surface (surface Y1). The release switch 10 and the continuous shooting mode switch 13 are arranged vertically below the viewfinder 2, the shooting lens 3 and the light emitting unit 4, and on side surface Y1, as shown in FIG. 1.

A recording switch 12 to be operated when recording sound and a power switch 11 are provided on the surface Y2 (right surface) opposite the surface Y1. Like the release switch 10 and the continuous shooting mode switch 13 described above, the recording switch 12 and the power switch 11 are arranged vertically below the viewfinder 2, the shooting lens 3 and the light emitting unit 4, which are provided on the top edge section of the surface X1. The recording switch 12 on surface Y2, and the release switch 10 on the surface Y1 can be positioned at nearly the same height so that the user does not feel any difference when the camera is held either by the right hand or the left hand.

Alternatively, the height of the recording switch 12 and the release switch 10 may be intentionally changed so that the user will not accidentally press the switch provided on an opposite side surface when the other switch is pressed. Furthermore, the user's fingers can press against the opposite side surface to offset the moment created by the pressing of the other switch.

The continuous shooting mode switch 13 is used when the user decides on whether to shoot one frame or several frames of the object by pressing the release switch 10. For example, if the indicator of the continuous shooting mode switch 13 is pointed to the position printed "S" (in other words, when the switch is changed to the S mode), and the release switch 10 is pressed, the camera shoots only one frame.

If the indicator of the continuous shooting mode switching switch 13 is pointed to the position printed "L" (in other words, when the switch is changed to the L mode), and the release switch 10 is pressed, the camera shoots eight frames per second as long as the release switch 10 is pressed (thus, the low speed continuous shooting mode is enabled).

Furthermore, if the indicator of the continuous shooting mode switching switch 13 is pointed to the position printed "H" (in other words, when the switch is changed to the H mode), and the release switch 10 is pressed, the camera shoots 30 frames per second as long as the release switch 10 is pressed (thus, the high speed continuous shooting mode is enabled).

Figure 4:
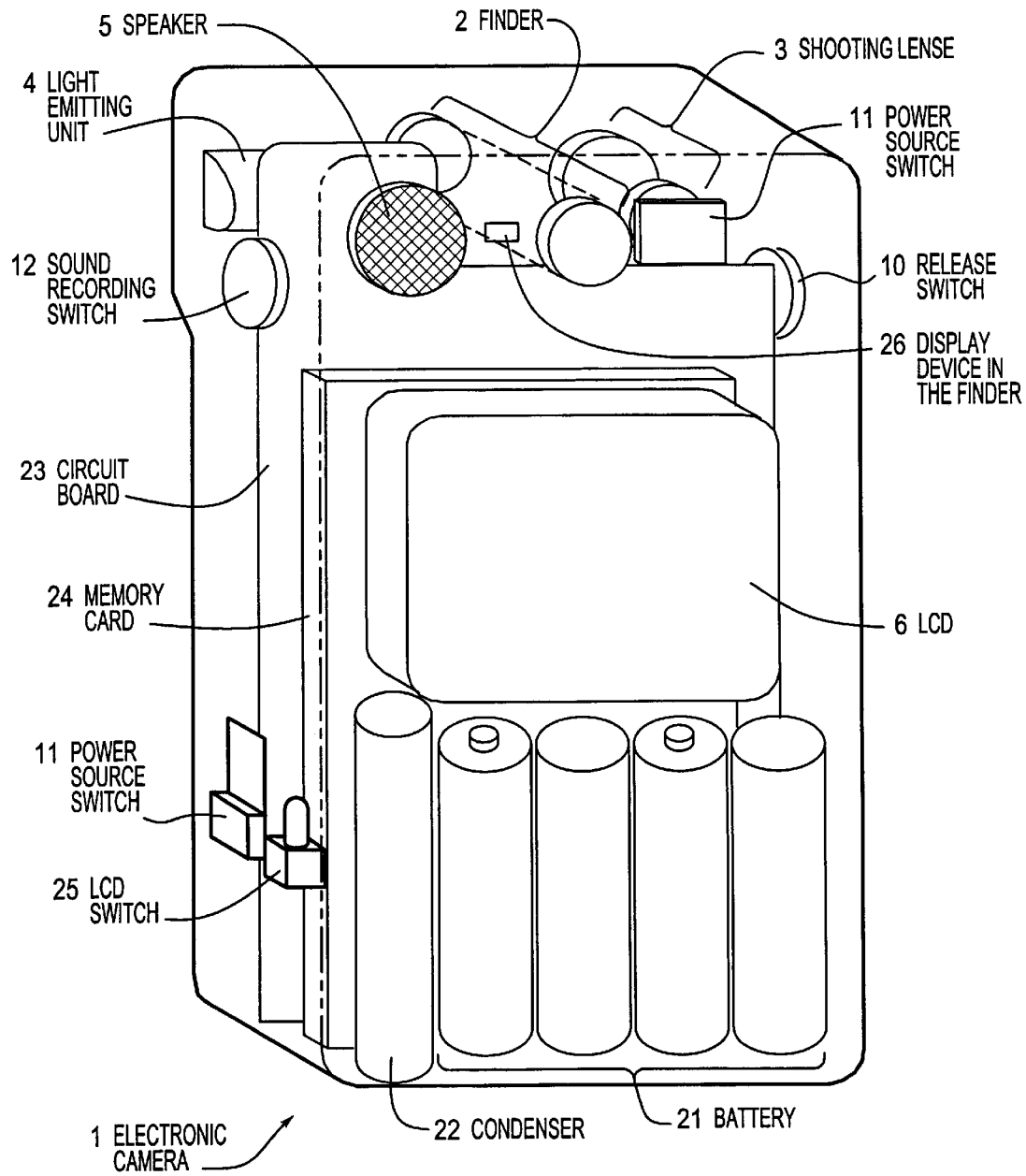
FIG. 4 is a perspective cut-away view showing the inside of the electronic camera shown in FIG. 1 and FIG. 2.

Next, the internal structure of the electronic camera 1 will be described. FIG. 4 is a perspective view showing an example of the internal structure of the electronic camera shown in FIG. 1 and FIG. 2. The CCD 20 is provided to the rear (in the direction of surface X2) of the shooting lens 3 and the optical image of the object imaged through the shooting lens 3 is photoelectrically converted to electrical signals by CCD 20.

A display device 26 in the viewfinder 2 is arranged inside a vision screen of the viewfinder 2 and displays the setting conditions and the like of the various functions for the user who views the object through the viewfinder 2.

Four cylindrical batteries (e.g., AA dry cell batteries) 21 are placed side by side vertically below the LCD 6 and the electrical power stored in the batteries 21 is supplied to each part. A capacitor 22 is provided below the LCD 6 and next to the batteries 21 to accumulate an electrical charge, which is used to cause the light emitting unit 4 to emit light.

Various control circuits are formed on a circuit board 23 to control each part of the electronic camera 1. A removable memory card 24 is provided between the circuit board 23, the LCD 6 and the batteries 21 so that information input into the electronic camera 1 is recorded in a preassigned area of the memory card 24.

An LCD switch 25 is arranged adjacent to the power source switch 11 and is a switch that turns on only when its protrusion is pressed. LCD switch 25 is switched to the ON-state along with the power source switch 11 by the arm unit 14A of the LCD cover 14 when the LCD cover 14 is moved vertically downward as shown in FIG. 5A.

If the LCD cover 14 moves vertically upward the power source switch 11 is operated by the user independent of the LCD switch 25. For example, if the LCD cover 14 is closed and the electronic camera 1 is not being used, the power source switch 11 and the LCD switch 25 are in the off-mode shown in FIG. 5B. From this mode, if the user switches the power source switch 11 to the on-mode as shown in FIG. 5C, the power source switch 11 assumes the on-mode but the LCD switch 25 remains in off-mode. On the other hand, when the power source switch 11 and the LCD switch 25 are in the off-mode as shown in FIG. 5B, and if the LCD cover 14 is opened, the power source switch 11 and the LCD switch 25 assume the on-mode as shown in FIG. 5A. Then when the LCD cover 14 is closed, only the LCD switch 25 assumes the off-mode shown in FIG. 5C.

In the present embodiment, the memory card 24 is removable, but a memory on which information can be recorded may be provided on the circuit board 23. Information recorded on the memory (memory card 24) may also be output to an external personal computer and the like through an unrepresented interface. Alternative types of memory medium that could be used include a magnetooptical disk, an optical disk, a magnetic disk, a ZIP card or other flash memory cards.

Figure 6:
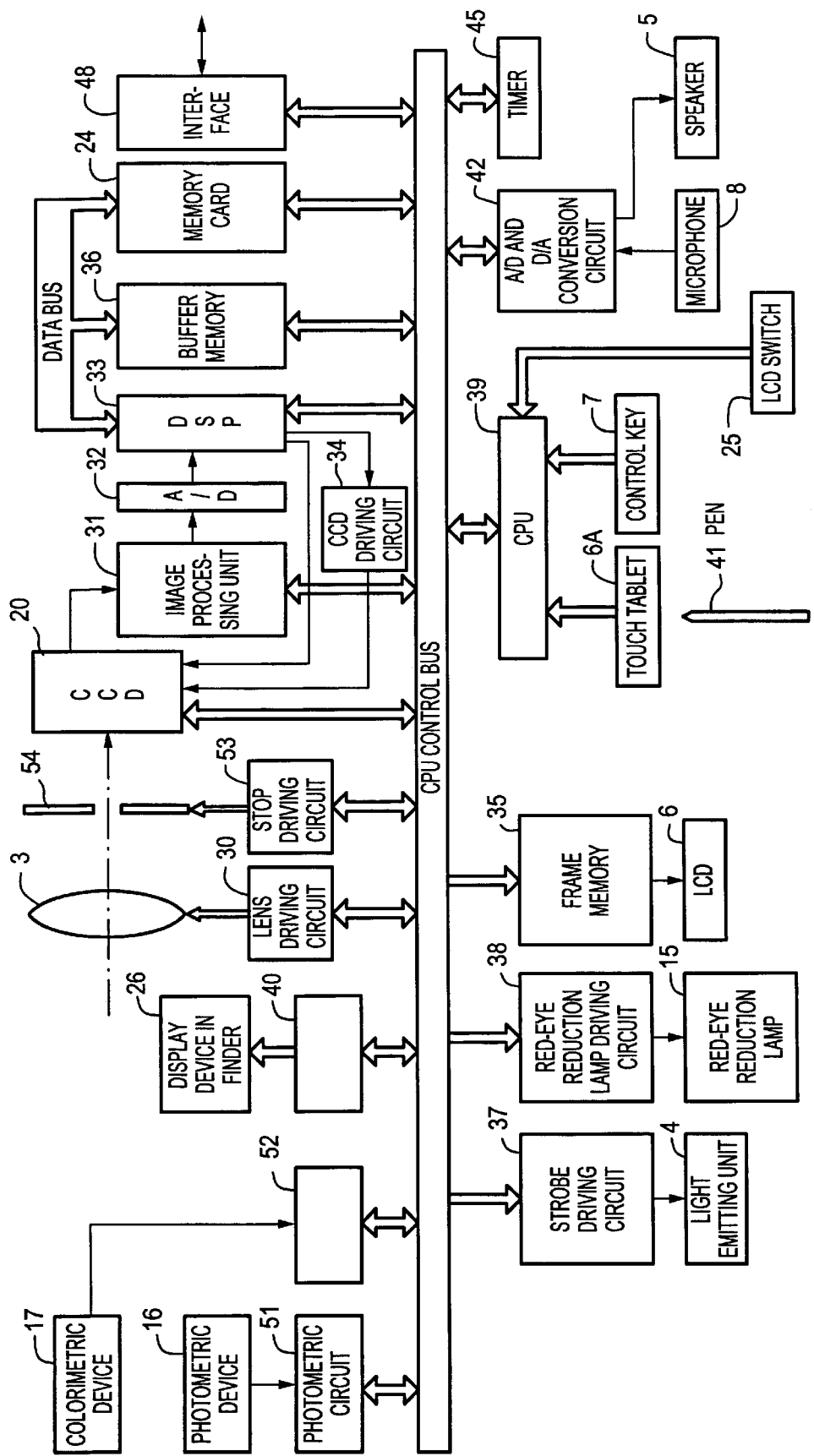
FIG. 6 is a block diagram showing an internal electrical structure of the electronic camera shown in FIG. 1 and FIG. 2.

Next, an internal electrical structure of the electronic camera 1 of the present embodiment is explained with reference to the block diagram of FIG. 6. The CCD 20 is equipped with a plurality of pixels which photoelectrically convert the optical image imaged on each pixel into image signals (electrical signals). A digital signal processor (hereafter referred to as DSP) 33 (which makes up part of the still image recording means), supplies a CCD horizontal driving pulse to the CCD 20, as well as supplying a CCD vertical driving pulse to the CCD 20 by controlling the CCD driving circuit 34.

An image processing unit 31 (which also makes up part of the still image recording means) is controlled by the CPU 39, samples the image signals which are photoelectrically converted by the CCD 20 with predetermined timing, and amplifies the sampled signals to a predetermined level. An analog/digital conversion circuit (hereafter the A/D conversion circuit) 32 (which also makes up part of the still image recording means) digitizes the image signals that are sampled by the image processing unit 31 and supplies them to the DSP 33.

The DSP 33 controls the buffer memory 36 and the data bus connected to the memory card 24. DSP 33 temporarily stores the image data that is supplied from the A/D conversion circuit 32 in the buffer memory 36, then reads the image data stored in the buffer memory 36, and records the image data on the memory card 24.

The DSP 33 sends image data to a frame memory 35 for storing the image data that is supplied by the A/D conversion circuit 32. Image data from frame memory 35 is displayed on the LCD 6. The DSP 33 also reads the shooting image data from the memory card 24, decompresses the shooting data, then stores the decompressed image data in the frame memory 35, and displays the decompressed image data on the LCD 6.

The DSP 33 operates the CCD 20 repeatedly by adjusting the exposure time (exposure value) until the exposure level of the CCD 20 reaches an appropriate level at the time of starting the electronic camera 1. At this time, the DSP 33 may operate the photometric circuit 51 first, then compute the initial value of the exposure time of the CCD 20 corresponding to the light receiving level detected by the photometric device 16. This enables adjustment of exposure time for the CCD 20 to be achieved in a short time.

In addition, the DSP 33 executes timing management for data input/output during recording on the memory card 24 and storing decompressed image data in the buffer memory 36.

The buffer memory 36 is used to compensate for the difference between the data input/output speed for the memory card 24 and the processing speed of the CPU 39 and the DSP 33.

The microphone 8 inputs sound information (gathers sound) and supplies the sound information to the A/D and D/A conversion circuit 42 (sound recording means).

The A/D and D/A conversion circuit 42 converts the analog signals to digital signals, supplies the digital signals to the CPU 39, changes the sound data supplied by the CPU 39 to analog signals, and outputs the sound signal that has been changed to analog signals to the speaker 5.

The photometric device 16 measures the amount of light from the object and its surrounding area and outputs the measurement results to the photometric circuit 51.

The photometric circuit 51 executes a predetermined process to the analog signals, which include the measurement results supplied from the photometric device 16, and then converts the processed analog signals to digital signals, and outputs the digital signals to the CPU 39.

The color measuring (calorimetric) device 17 measures the color temperature of the object and its surrounding area and outputs the measurement results to the calorimetric circuit 52.

The calorimetric circuit 52 executes a predetermined process to the analog signals, which comprise the color measurement results supplied from the photometric device 17, and then converts the processed analog signals to digital signals, and outputs the digital signals to the CPU 39.

A timer 45 has an internal clock circuit and outputs data corresponding to the current time to the CPU 39.

A stop driving circuit 53 sets the diameter of an aperture stop 54 to a predetermined value. The stop 54 is arranged between the shooting lens 3 and the CCD 20 and changes the aperture for the light entering from the shooting lens 3 to the CCD 20.

The CPU 39 stops the operation of the photometric circuit 51 and the calorimetric circuit 52 when the LCD cover 14 is open. The CPU 39 runs the operation of the photometric circuit 51 and the calorimetric circuit 52 when the LCD cover 14 is closed, and stops the operation of the CCD 20 (by electronic shutter operation, for example) until the release switch 10 reaches a half-depressed mode (the state in which a first control is executed).

The CPU 39 receives the light measurement results of the photometric device 16, and receives the color measurement results of the calorimetric device 17 by controlling the photometric circuit 51 and the colorimetric circuit 52 when the operation of the CCD 20 is stopped.

The CPU 39 computes a white balance adjustment value corresponding to the color temperature supplied from the colorimetric circuit 52 using a predetermined table, and supplies the white balance value to the image processing unit 31.

In other words, when the LCD cover 14 is closed, the LCD 6 is not used as an electronic viewfinder, hence the operation of the CCD 20 stops. The CCD 20 consumes a large amount of electric power. Therefore, stopping operation of the CCD 20 as described above enables the power of the batteries 21 to be conserved.

When the LCD cover 14 is closed, the image processing unit 31 is controlled so that the image processing unit 31 does not execute various processes until the release switch 10 is operated (until the release switch 10 reaches a half-depressed state).

When the LCD cover 14 is closed, the stop driving circuit 53 is controlled so that the stop driving circuit 53 does not execute an operation such as changing the diameter of the aperture stop 54 until the release switch 10 is operated (until the release switch 10 reaches a half-depressed state).

The CPU 39 controls the light emitting unit (strobe) 4 to emit light, at the user's discretion, by controlling the strobe driving circuit 37. The CPU 39 also controls the red eye reduction lamp 15 to emit light, at the discretion of the user, prior to having the strobe 4 emit light by controlling the red eye reduction lamp driving circuit 38.

The CPU 39 causes the strobe 4 not to emit light when the LCD cover 14 is open (in other words, when the LCD is used as an electronic viewfinder). By doing so, the object may be shot as the image displayed in the electronic viewfinder.

The CPU 39 records information concerning the date of shooting as header information for the image data stored in the shooting image recording area of the memory card 24 according to the date data supplied from the timer 45. (In other words, the date of shooting data is attached to the shooting image data recorded in the shooting image recording area of the memory card 24.)

The CPU 39 temporarily records digitized and compressed sound data after compressing the digitized sound information to the buffer memory 36, and then records it in a predetermined area (sound recording area) of the memory card 24. The recording date is also recorded simultaneously in the sound recording area of the memory card 24 as header information for the sound data.

The CPU 39 executes an auto focus operation by controlling a lens driving circuit 30 and by moving the shooting lens 3. The CPU 39 also changes the aperture diameter of the stop 54, which is arranged between the shooting lens 3 and the CCD 20, by controlling the stop driving circuit 53.

Additionally, the CPU 39 displays settings and the like for various operations on the display device 26 inside the viewfinder by controlling the display circuit 40 inside the viewfinder.

The CPU 39 exchanges predetermined data with a predetermined external apparatus (unrepresented) through an interface (I/F) 48.

The CPU 39 receives signals from any of the keys that make up the control keys 7 and processes the signals appropriately.

When a predetermined position on the touch tablet 6A is pressed by a pen 41 (pen type pointing device), which is operated by the user, the CPU 39 reads the X-Y coordinates of the position pressed on the touch tablet 6A and stores the coordinate data (line drawing information to be explained later) in the buffer memory 36. The CPU 39 records the line drawing information that is stored in the buffer memory 36 in the line drawing information recording area of the memory card 24 together with header information consisting of the line drawing information input date.

Next, various operations of the electronic camera 1 according to a preferred embodiment will be explained. To begin with, the operation of the electronic viewfinder in the LCD 6 of the present apparatus will be described.

When the user half-depresses the release switch 10, the DSP 33 determines whether LCD cover 14 is open based on the value of a signal corresponding to the status of the LCD switch 25, which is supplied from the CPU 39. If the LCD cover 14 is determined to be closed the operation of the electronic viewfinder is not executed. In this case, the DSP 33 stops the process until the release switch 10 is operated.

If the LCD cover 14 is closed, the operation of the electronic viewfinder is not executed and the CPU 39 stops the operation of the CCD 20, the image processing unit 31 and the stop driving circuit 53. The CPU 39 causes the photometric circuit 51 and the calorimetric circuit 52 to operate instead of stopping the CCD 20, and supplies the measurement results to the image processing unit 31. The image processing unit 31 uses the values of the measurement results to control the white balance and the value of brightness.

If the release switch 10 is operated to at least the half-depressed position with the LCD cover 14 closed, the CPU 39 causes the CCD 20 and the stop driving circuit 53 to operate.

On the other hand, if the LCD cover 14 is open, the CCD 20 executes an electronic shutter operation with a predetermined exposure time for each predetermined time interval. CCD 20 then executes photoelectric conversion of the photo image of the object, which is gathered by the shooting lens 3, and outputs the resulting image signals to the image processing unit 31.

The image processing unit 31 controls white balance and brightness value, executes a predetermined process on the image signals, and then outputs the image signals to the A/D conversion circuit 32. If the CCD 20 is operating, the image processing unit 31 uses an adjusted value that is computed based on the output from the CCD 20 by the CPU 39 and that is used for controlling the white balance and brightness value.

Furthermore, the A/D conversion circuit 32 converts the image signal (analog signal) into the image data, which is a digital signal, and outputs the image data to the DSP 33.

The DSP 33 outputs the image data to the frame memory 35 and causes the LCD 6 to display an image corresponding to the image data.

In this manner, the CCD 20 of electronic camera 1 operates the electronic shutter at a predetermined time interval when the LCD cover 14 is open. The operation of the electronic viewfinder is executed by converting the signal output from the CCD 20 into image data during said time interval, outputting the image data to the frame memory 35 and continuously displaying the image of the object on the LCD 6.

If the LCD cover 14 is closed as described above, the electronic viewfinder operation is not executed and the operation of the CCD 20, the image processing unit 31 and the stop driving circuit 53 are halted to conserve energy.

Next, shooting of the object using the present apparatus will be described.

First, a case in which the continuous shooting mode switch 13 provided on the surface Y1 is switched to the S-mode (the mode in which only one frame is shot) will be explained. To begin with, power is introduced to the electronic camera 1 by switching the power source switch 11 shown in FIG. 2 to the "ON" position. The shooting process of the object begins when the release switch 10 provided on the surface Y1 is pressed after verifying that the object appears through the viewfinder 2.

In this case, if the LCD cover 14 is closed, the CPU 39 resumes the operation of the CCD 20, the image processing unit 31 and the stop driving circuit 53 when the release switch 10 reaches a half-depressed status, and begins the shooting process of the object when the release switch 10 reaches a fully-depressed status (the state in which a second control is executed).

The photo image of the object being observed through the viewfinder 2 is gathered by the shooting lens 3 and forms an image on the CCD 20, which has a plurality of pixels. The photo image that is imaged onto the CCD 20 is photoelectrically converted into an image signal by each pixel, and is sampled by the image processing unit 31. The image signal that is sampled by the image processing unit 31 is supplied to the A/D conversion circuit 32 where it is digitized, and is output to the DSP 33.

The DSP 33, after outputting the image temporarily to the buffer memory 36, reads the image data from the buffer memory 36, compresses the image data using the JPEG (Joint Photographic Experts Group) standard, which is a combination of a discrete cosine transformation, quantization, and Huffman encoding, and records the image data in the shooting image recording area of the memory card 24. At this time, the shooting date data is recorded as header information of the shooting image data in the shooting image recording area of the memory card 24.

In this case, if the continuous shooting mode switch 13 is switched to the S-mode, only one frame is shot and further shooting does not take place even if the release switch 10 continues to be pressed. If the release switch 10 continues to be pressed, the image which has been shot is displayed on the LCD when the LCD cover 14 is open.

Next, a second case is explained in which the continuous shooting mode switch 13 is switched to the L-mode (a mode in which 8 frames per second are shot continuously). To begin with, power is introduced to the electronic camera 1 by switching the power source switch 11 to the "ON" side. The shooting process of the object begins when the release switch 10 provided on the surface Y1 is pressed.

In this case, if the LCD cover 14 is closed, the CPU 39 resumes the operation of the CCD 20, the image processing unit 31 and the stop driving circuit 53 when the release switch 10 reaches a half-depressed status. The shooting process of the object is begun when the release switch 10 is in the fully-depressed status.

The photo image of the object being observed through the viewfinder 2 is gathered by the shooting lens 3 and forms an image on the CCD 20. The photo image that is imaged onto the CCD 20 is photoelectrically converted into an image signal by each pixel, and is sampled by the image processing unit 31 at a rate of 8 times per second. The image processing unit 31 thins out three-fourths of the pixels of image electrical signals of all of the pixels in the CCD 20.

Figure 7:
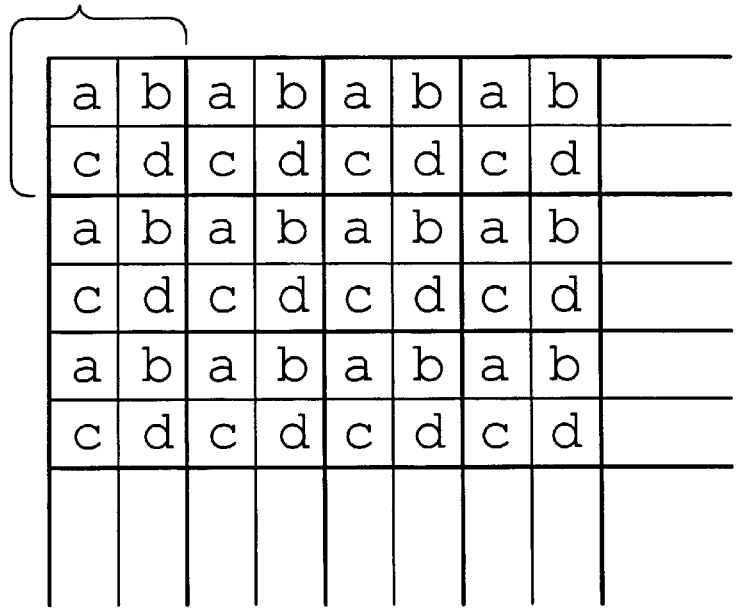
FIG. 7 is a schematic drawing illustrating a thinning process of the pixels during L mode.

In other words, the image processing unit 31 divides the pixels in the CCD 20 into areas each composed of 2×2 pixels (4 pixels) as shown in FIG. 7, and samples the image signal of one pixel arranged in a predetermined location from each area, thinning out the remaining 3 pixels.

For example, during the first sampling (first frame), the pixel located on the left upper corner of the first area is sampled and other pixels b, c and d are thinned out. During the second sampling (second frame), the pixel b located on the right upper corner is sampled and other pixels a, c and d are thinned out. Likewise, during the third and the fourth sampling, the pixels c and d respectively located at the left lower corner and the right lower corner are sampled and the rest are thinned out. Thus, each pixel is sampled once during four samplings.

The image signals (image signals of one fourth of all the pixels in the CCD 20) that are sampled by the image processing unit 31 are supplied to the A/D conversion circuit 32 where they are digitized and output to the DSP 33.

The DSP 33, after outputting the image temporarily to the buffer memory 36, reads the image data from the buffer memory 36, compresses the image data using the JPEG method, and records the digitized and compressed shooting image data in the shooting image recording area of the memory card 24. At this time, the shooting date data is recorded as header information of the shooting image data in the shooting image recording area of the memory card 24.

In a third case, the continuous shooting mode switch 13 is switched to the H-mode (a mode in which 30 frames are shot per second). Power is introduced to the electronic camera 1 by switching the power source switch 11 to the "ON" position. The shooting process of the object begins when the release switch 10 provided on the surface Y1 is pressed.

In this case, if the LCD cover 14 is closed, the CPU 39 resumes the operation of the CCD 20, the image processing unit 31 and the stop driving circuit 53 when the release switch 10 reaches a half-depressed status, and begins the shooting process of the object when the release switch 10 reaches a fully-depressed status.

The optical image of the object that is observed through the viewfinder 2 is gathered by the shooting lens 3 and is imaged on the CCD 20. The optical image of the object imaged onto the CCD 20 is photoelectrically converted to an image signal by each pixel and is sampled 30 times per second by the image processing unit 31. At this time, the image processing unit 31 thins out eight-ninths of the pixels in the image electrical signals of all the pixels in the CCD 20.

Figure 8:
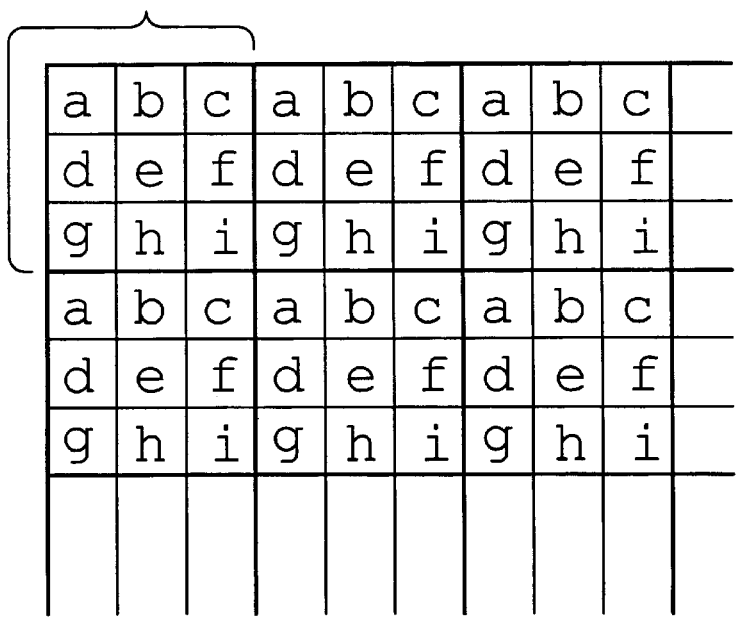
FIG. 8 is a schematic drawing illustrating a thinning process of the pixels during H mode.

In other words, the image processing unit 31 divides the pixels in the CCD 20, which are arranged in a matrix, into areas comprising 3×3 pixels (9 pixels) as shown in FIG. 8. The image processing unit then samples, at 30 times per second, the image signal of one pixel that is arranged at a predetermined position in each area. The remaining 8 pixels are thinned out.

For example, during the first sampling (first frame), the pixel located on the left upper corner of each area is sampled and other pixels b through i are thinned out. During the second sampling (second frame), the pixel b located on the right of a is sampled and other pixels a and c through i are thinned out. Likewise, during the third, the fourth etc. samplings, the pixel c, the pixel d . . . are sampled respectively and the rest are thinned out. In short, each pixel is sampled once for every nine frames.

The image signals (image signals of one-ninth of all the pixels in the CCD 20) that are sampled by the image processing unit 31 are supplied to the A/D conversion circuit 32 where they are digitized and are output to the DSP 33.

The DSP 33, after outputting the image temporarily to the buffer memory 36, reads the image data, compresses the image data using the JPEG method, and records the digitized and compressed shooting image data in the shooting image recording area of the memory card 24.

In this case, light may be shone onto the object, if necessary, by operating the strobe 4. However, when the LCD cover 14 is open, or when the LCD 6 is executing an electronic viewfinder operation, the CPU 39 controls the strobe 4 so as not to emit light.

Next, an operation is described in which two dimensional information (pen input information) is input from the touch tablet 6A.

When the touch tablet 6A is pressed by the tip of the pen 41, the X-Y coordinates of the contact point are supplied to the CPU 39. The X-Y coordinates are stored in the buffer memory 36. The CPU 39 writes data of the address to the frame memory 35 that corresponds to each contact point having the X-Y coordinates. A line drawing corresponding to movement of the contact point of the pen 41 may be displayed on the LCD 6.

As described above, the touch tablet 6A is made of transparent material, so the user is able to view the contact point (the point on touch tablet 6A being pressed by the tip of the pen 41) displayed on the LCD 6. Hence, the impression is given that an input is being made by the pen directly onto the LCD 6. When the pen 41 is moved on the touch tablet 6A, a line tracing the motion of the pen 41 is displayed on the LCD 6. If the pen 41 is moved intermittently on and off of the touch tablet 6A, a dotted line tracing the motion of the pen 41 is displayed on the LCD 6. In this manner, the user is able to input line drawing information corresponding to desired letters, drawings and the like to the touch tablet 6A (LCD 6).

If the line drawing information is input by the pen 41 when the shooting image is already displayed on the LCD 6, the line drawing information is synthesized (combined) with the shooting image information by the frame memory 35 and both are displayed together on the LCD 6.

By operating a predetermined pallet (not shown), the user is able to choose the color of the line drawing to be displayed on the LCD 6 from black, white, red, blue and others.

If the execution key 7B is pressed after the line drawing information is input to the touch tablet 6A by the pen 41, the line drawing information that is accumulated in the buffer memory 36 is supplied with header information of the input date to the memory card 24 and is recorded in the line drawing information recording area of the memory card 24.

In this case, the line drawing information that is recorded in the memory card 24 is compressed information. The line drawing information that is input in the touch tablet 6A contains information with a high spatial frequency component. Therefore, if the aforementioned JPEG method is used for the compression of the line drawing information, the compression efficiency becomes poor and the information amount is not reduced, resulting in a longer time for compression and decompression. Furthermore, compression by the JPEG method is lossey compression. Hence, it is not suitable for the compression of line drawing information having a small amount of information. (This is because gather and smearing due to missing information become noticeable when information is decompressed and displayed on the LCD 6.)

Hence, in a preferred embodiment, line drawing information is compressed using the run length method, which is used in facsimile machines and the like. The run length method is a method in which a line drawing screen is scanned in a horizontal direction and line drawing information is compressed by encoding each continuous length of information of each color such as black, white, red and blue as well as each continuous length of non-information (where there is no pen input).

Using the run length method, line drawing information is compressed to a minimum amount and control of missing information becomes possible even when the compressed line drawing information is decompressed. Furthermore, it is possible to not compress line drawing information if the amount of information is relatively small.

As mentioned above, if the line drawing information is input by the pen when the shooting image is already displayed on the LCD 6, the pen input is synthesized with the shooting image information by the frame memory 35 and the synthesized image of the shooting image and line drawing is displayed on the LCD 6. On the other hand, the shooting image data is recorded in the shooting image recording area and the line drawing information is recorded in the line drawing information recording area of the memory card 24. Therefore, the two types of information are recorded separately. This allows the user to delete one of the two types of images (line drawing, for example) from the synthesized images of shooting image and line drawing, thereby enabling further compression of each type of image information by a separate compression method.

Figure 9:
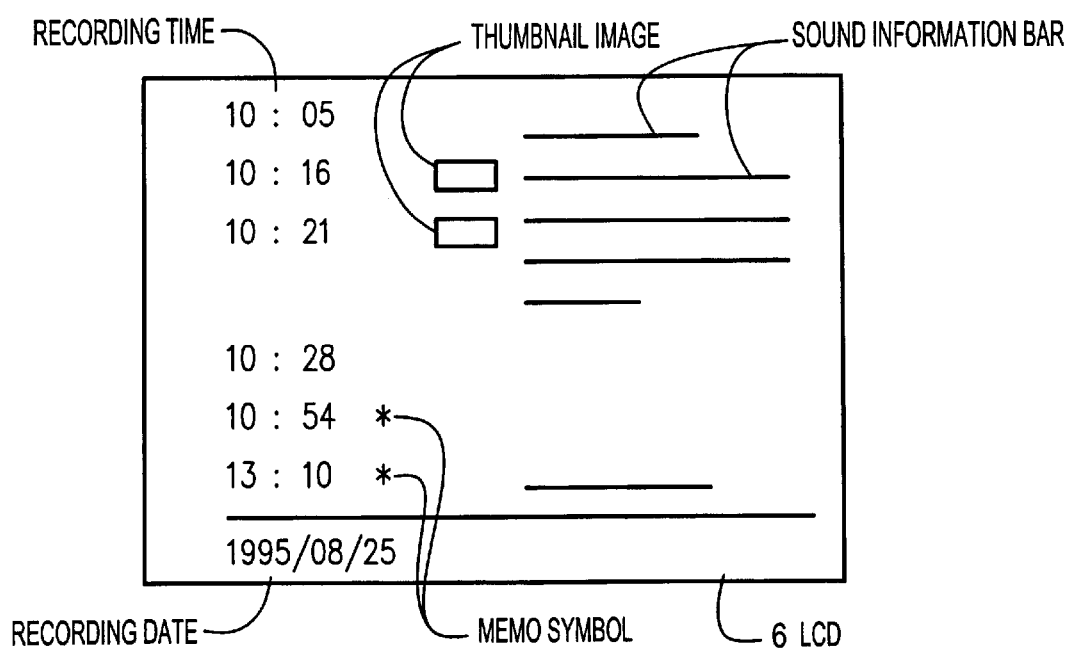
FIG. 9 is an elevational view showing an example of a display screen of the electronic camera shown in FIG. 1 and FIG. 2.

When data are recorded in the sound recording area, the shooting image recording area and/or the line drawing information recording area of the memory card 24, a predetermined display appears on the LCD 6, as shown in FIG. 9.

In the display screen of the LCD 6 shown in FIG. 9, the date of the recording information (recording date—Aug. 25, 1995 in FIG. 9) is displayed on the bottom section of the screen, and the recording time of the information recorded on the recording date are displayed on the left-most side of the screen.

To the right of the recording time, a thumbnail image is displayed. The thumbnail image is formed by thinning out (reducing) the bit map data for each image data from the shooting image data recorded in the memory card 24. Information displayed with a thumbnail image is information containing the shooting image information. In other words, information that is recorded (input) at "10:16", and "10:21" contains the shooting image information, but information that is recorded at "10:05", "10:28" "10:54" and "13:10" does not contain shooting image information.

A memo symbol "*" indicates that memo information is recorded as line drawing information.

A sound information bar is displayed to the right of the thumbnail image display area. The bar has a length corresponding to the length of sound recording time.

The user selects and designates the information to be reproduced by pressing, with the tip of the pen 41, any part of the display line of the desired information on the LCD 6 shown in FIG. 9, and the selected information is reproduced by pressing the execution key 7B shown in FIG. 2 with the tip of the pen 41.

For example, if the line for which "10:05" is shown in FIG. 9 is pressed by the pen 41, the CPU 39 reads the sound data corresponding to the selected recording time (10:05) from the memory card 24, decompresses the sound data, and then supplies the sound data to the A/D and D/A conversion circuit 42. The A/D and D/A conversion circuit 42 converts the data to analog signals, and then reproduces the sound through the speaker 5.

In reproducing the shooting image data that is recorded in the memory card 24, the user selects the information by pressing the desired thumbnail image with the tip of the pen 41, and then reproduces the selected information by pressing the execution key 7B.

In other words, the CPU 39 instructs the DSP 33 to read the shooting image data corresponding to the selected image shooting data from the memory card 24. The DSP 33 decompresses the shooting image data (compressed shooting data) that is read from the memory card 24 and stores the shooting image data as bit map data in the frame memory 35 and displays it on the LCD 6.

The image that is shot in the S-mode is displayed as a still image on the LCD 6. This still image is the image reproduced from the image signals of all the pixels in the CCD 20.

The image that is shot in the L-mode is displayed continuously at 8 frames per second on the LCD 6. In this case, the number of pixels displayed in each frame comprises one-fourth of all of the pixels in the CCD 20.

Human vision is sensitive to the deterioration of resolution of the still image, hence the user may easily detect a thinning out of the pixels in the still image. However, when the shooting speed is increased as in the L-mode where images of 8 frames are reproduced per second, the number of pixels in each frame becomes one fourth of the number of pixels of the CCD 20, but the information amount per unit time doubles compared to the still image because the human eyes observe images at 8 frames per second.

In other words, assuming the number of pixels of one frame of the image that is shot in the S-mode to be one, the number of pixels in one frame of the image that is shot in the L-mode becomes one-fourth. When the image (still image) that is shot in the S-mode is displayed on the LCD 6, the amount of information viewed by the human eye per second is 1(=(number of pixels 1)×(number of frames 1)). On the other hand, when the image that is shot in the L-mode is displayed on the LCD 6, the amount of information viewed by the human eye per second is 2(=(number of pixels ¼)×(number of frames 8)). In other words, twice as much information is viewed by the human eye. Hence, even when the number of pixels in one frame is reduced to one-fourth, the user does not notice a deterioration of the image quality during reproduction.

In the present embodiment, different sampling is executed for each frame and the sampled pixels are displayed on the LCD 6. Therefore, an after image effect occurs for the human eye and the user may be able to view the image that is shot in the L-mode and displayed on the LCD 6 without noticing the deterioration of the image, even when three-fourths of the pixels are thinned out per one frame.

The image that is shot in the H-mode is displayed on the LCD 6 at 30 frames per second. In this case, the number of pixels displayed in each frame is one-ninth of the total number of the pixels of the CCD 20. However, the user is able to view the image that is shot in the H-mode and displayed on the LCD 6 without noticing the deterioration of image quality for the same reason as in the case of the L-mode.

In the present embodiment, when the object is shot in the L-mode or the H-mode, because the image processing unit 31 thins out the pixels in the CCD 20 so that the user does not notice the deterioration of the image quality during reproduction, the load on the DSP 33 and the decompression process unit 34 is reduced, enabling the low velocity and low power operation of these units. Furthermore, low cost and low energy consumption by the apparatus may be achieved.

Now, in a preferred embodiment, the operation of the release switch 10 enables simultaneous recording of image and sound. Next, such an operation will be described with reference to FIG. 10.

Figure 10:
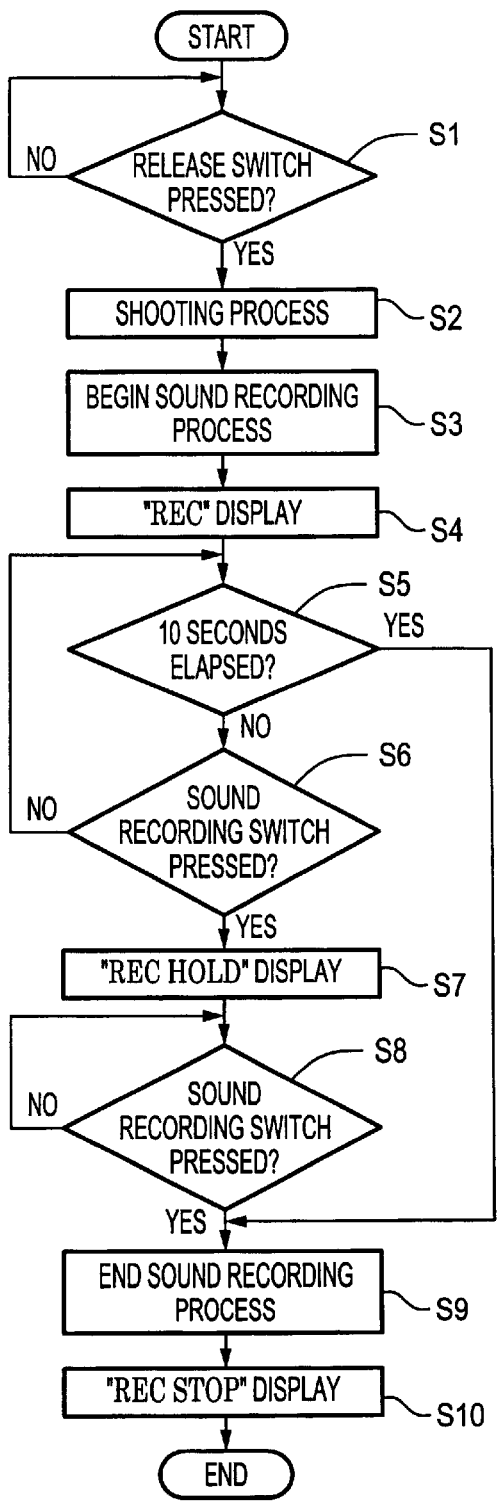
FIG. 10 is a flow chart of a process that is executed in an embodiment of the invention.

FIG. 10 is a flow chart describing a process to record images and sound by pressing the release switch 19. In this case, a program with executable instructions for controlling the information processing apparatus may be supplied to the user encoded in the memory card 24 or stored in a CD-ROM (compact disk-ROM) that can be copied onto the memory card 24. Such a program also could be provided via a communications network, such as, for example, the Internet (World Wide Web).

The process shown in FIG. 10 is executed when the "sound simultaneous recording mode" is selected in a menu screen displayed by operating the menu key 7A. When this process is executed, the CPU 39, in step S1, determines whether the release switch 10 is pressed. As a result, if the release switch 10 is determined not to have been pressed (NO), the CPU 39 returns to step S1 and repeats the same process until the release button 10 is pressed. If the release button 10 is determined to have been pressed (YES), the CPU 39 moves to step S2.

In step S2, the shooting process is executed. More particularly, the photo image of the subject is input through the CCD 20, sampled by the image processing unit 31, further converted into digital signals through the A/D conversion circuit 32, data-compressed by the DSP 33 based on the JPEG method, and then stored in the shooting image recording area of the memory card 24 with the shooting date data.

In the following step S3, the sound recording process is executed. More particularly, the sound that is input in the microphone 8 is converted into corresponding electrical signals and supplied to the A/D and D/A conversion circuit 42, where it is further converted to digital signals, after which the results are successively recorded in the memory card 24.

Figure 11:
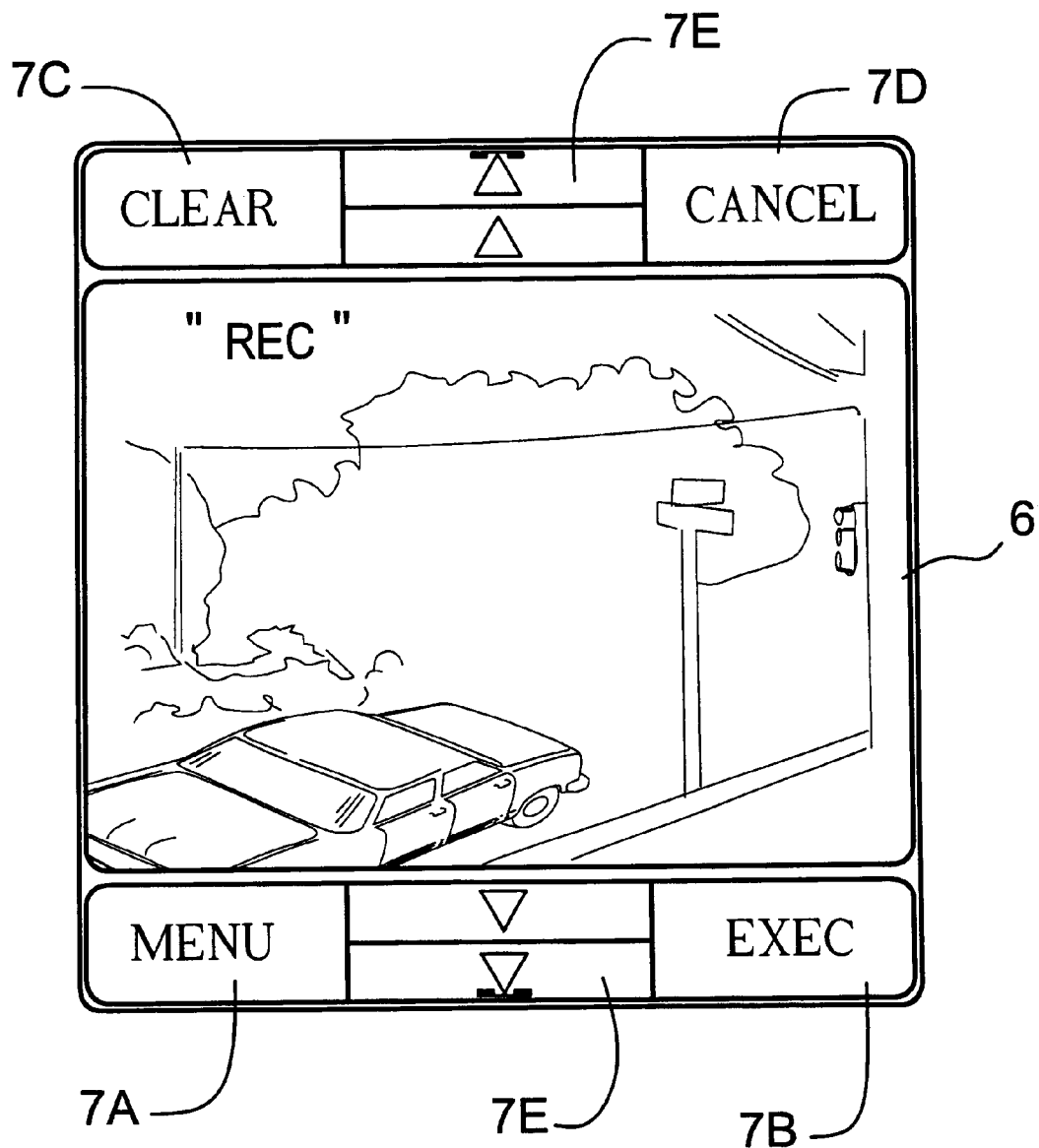
FIG. 11 is a representation of an intermediate tone image that is displayed when step S4 of the flow chart in FIG. 10 is executed.

In the following step S4, the CPU 39 causes letters "REC" to be displayed on the LCD 6 in order to indicate that the sound recording process is started. FIG. 11 is a representation of a photograph of an intermediate tone image that is displayed in the LCD 6 at this time. In this display example, an image that is shot is displayed in the LCD 6. The letters "REC" are displayed on the upper left corner of the screen, indicating that the sound recording process is being executed.

Returning to FIG. 10, the CPU 39 determines in step S5 whether 10 seconds have elapsed since the start of the sound recording process (after pressing of the release switch 10). As a result, if 10 seconds have elapsed (YES), the CPU 39 moves to step S9, but if 10 seconds have not elapsed (NO), the CPU 39 moves to step S6.

In step S6, the CPU 39 determines whether the sound recording switch 12 is pressed. As a result, if the sound recording switch 12 has not been pressed (NO), the CPU 39 returns to step S5 and repeats the same process as in the previous case. If the sound recording switch 12 has been pressed (YES), the CPU 39 moves to step S7.

Figure 12:
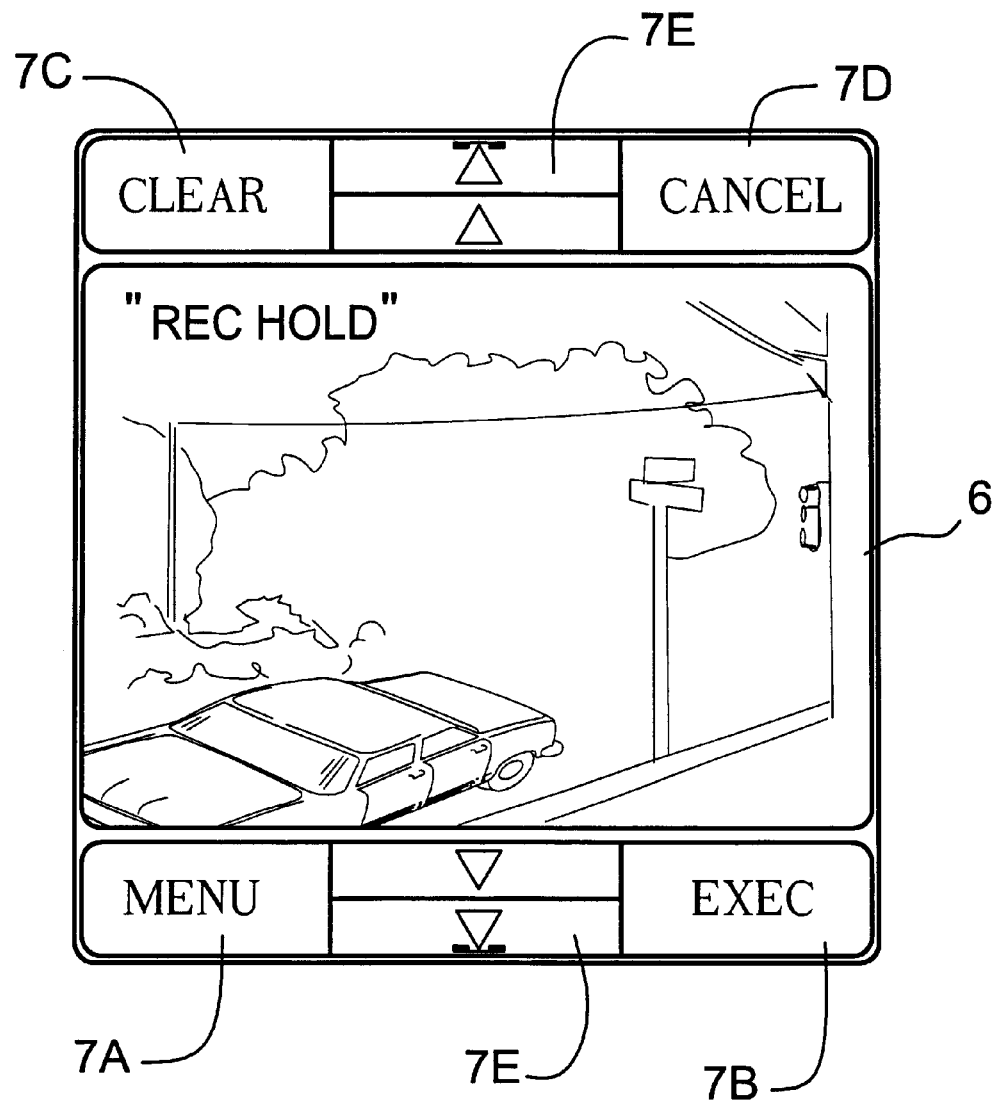
FIG. 12 is a representation of an intermediate tone image that is displayed when step S7 of the flow chart in FIG. 10 is executed.

In step S7, the CPU 39 displays the expression "REC HOLD" in the LCD 6 to indicate that the sound recording is in a hold state (sound recording is being continued). FIG. 12 is a representation of a photograph of an intermediate tone image displayed in the LCD 6 at this time. In this display example, the image that is shot is displayed in the LCD 6 and the expression "REC HOLD" is displayed on the upper left corner of the screen, indicating that the sound recording process is being continued.

In the following step S8, the CPU 39 determines whether the sound recording switch 12 is pressed again. As a result, if the sound recording switch 12 has not been pressed again (NO), the CPU 39 returns to step S8 and repeats the same process until the sound recording switch 12 is pressed. If the sound recording switch 12 has been pressed (YES), the CPU 39 moves to step S9.

If the decision at step S5 or step S8 is YES, the CPU 39 moves to step S9. In step S9, the CPU 39 ends the sound recording process that is started in step S3. More particularly, the CPU 39 sends predetermined control signals to the A/D and D/A conversion circuit 42 to end the A/D conversion process of sound signals, and stops the storage process of sound data for the memory card 24.

Figure 13:
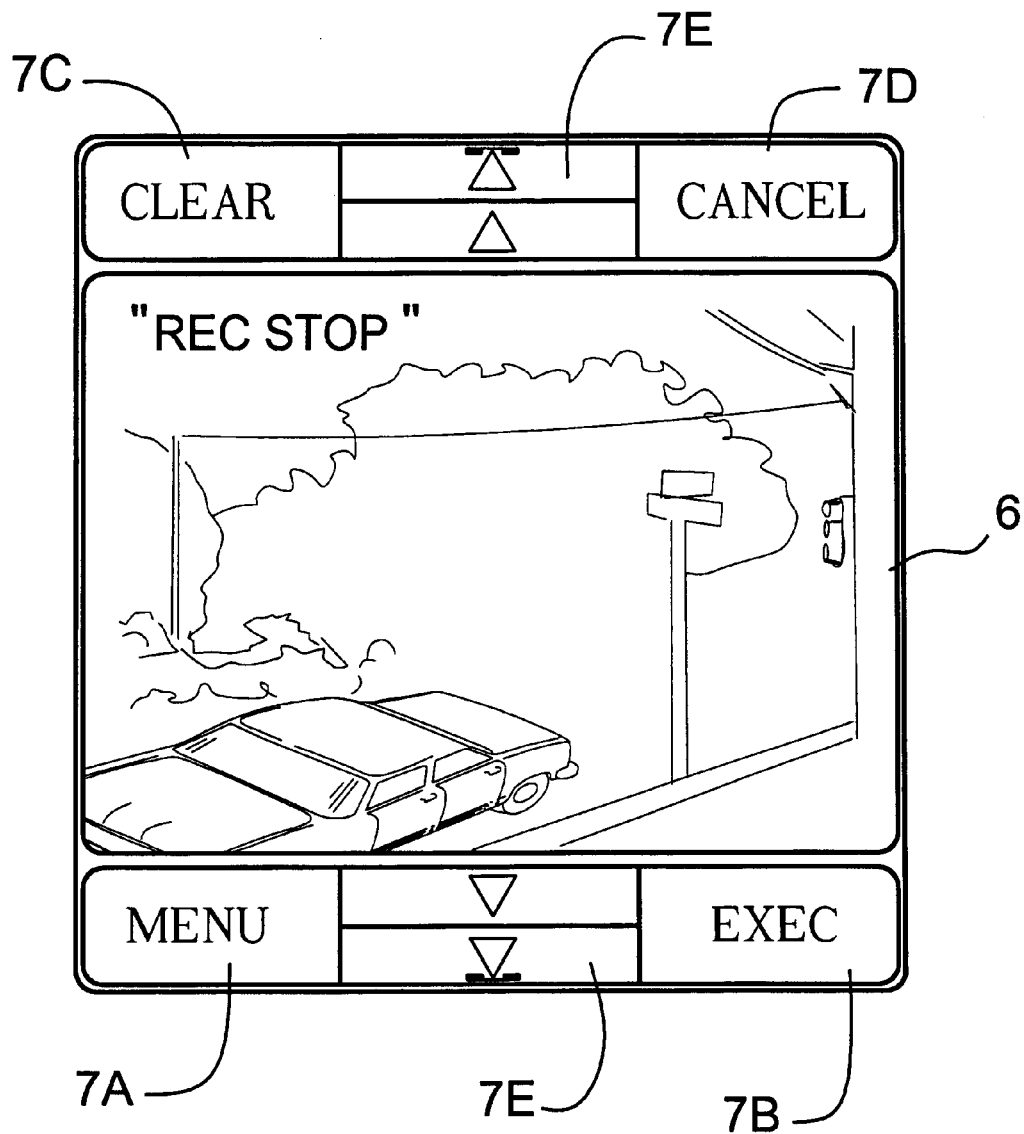
FIG. 13 is a representation of an intermediate tone image that is displayed when step S10 of the flow chart in FIG. 10 is executed.

The CPU 39 then performs step S10 and ends the process by displaying the expression "REC STOP" on the LCD 6 (END). FIG. 13 is a representation of a photograph of an intermediate tone image displayed in the LCD 6 in step S10. In this display example, an image that is shot is displayed with the expression "REC STOP" on the upper left corner of the screen, indicating that the sound recording process is ended.

In a process such as the one described above, if the release button 10 is pressed, shooting is executed and the sound recording process is started, with the sound recording process ending automatically after 10 seconds. If the sound recording switch 12 is pressed during the 10 seconds between the start of the sound recording and automatic completion of sound recording, the decision in step S6 is determined to be YES, and sound recording continues until the sound recording switch 12 is pressed again. Hence, it becomes possible to change the recording time if necessary. It is also possible to shorten the sound recording time to less than 10 seconds by operating the sound recording switch 12 twice consecutively during the 10 seconds after shooting.

In the embodiment described above, the sound recording process continues if the sound recording switch 12 is pressed during the 10 seconds after shooting and ends when the sound recording switch 12 is pressed again. However, it is also possible to have the sound recording continued when the sound recording switch 12 is pressed during the 10 seconds after shooting and to have the sound recording ended when the sound recording switch 12 is released.

Figure 14:
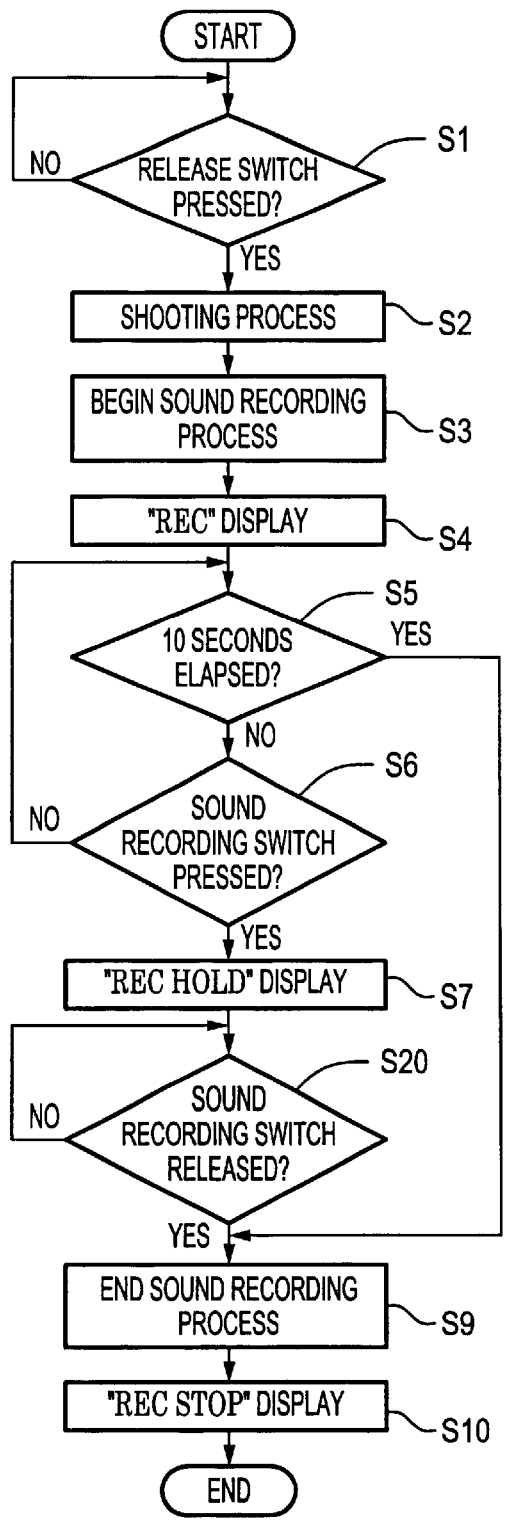
FIG. 14 is a flow chart of a process that is executed in another embodiment of the invention.

FIG. 14 is an example of a flow chart that enables a process such as the one described above. The parts corresponding to the parts in the flow chart of FIG. 10 are identified with the same symbols and the explanations of these parts are omitted for convenience. The program with executable instructions for controlling the information processing apparatus may be supplied to the user already encoded in the memory card 24 or stored on a CD-ROM (compact disc-ROM), which can be copied to the memory card 24, or provided via a communications network.

The flow chart of FIG. 14 is the same as the flow chart in FIG. 10 except that the process of step S8 is replaced by the process of step S20.

Upon execution of this process, the CPU 39 determines at step S1 whether the release switch 10 is pressed, and if the release switch 10 is pressed (YES), the CPU 39 moves to step S2. In step S2, the shooting process is executed and a predetermined process is executed on the image signals output from the CCD 20, after which the results are stored in the memory card 24.

In step S3, the sound recording process is started and sound signals output from the microphone 8 are converted into digital signals by the A/D and D/A conversion circuit 42, after which the results are successively recorded in the memory card 24.

In step S4, an expression "REC" is displayed on the upper left corner of the screen of the LCD 6 as shown in FIG. 11 to indicate that sound is being recorded. Then the CPU 39 moves to step S5 to determine whether 10 seconds have elapsed since the execution of shooting. If 10 seconds have elapsed (YES), the CPU 39 moves to step S9, but if 10 seconds have not elapsed (NO), the CPU 39 moves to step S6.

In step S6, the CPU 39 determines whether the sound recording switch 12 is pressed. As a result, if the sound recording switch 12 has not been pressed (NO), the CPU 39 returns to step S5 and repeats the same process, but if the sound recording switch 12 has been pressed (YES), the CPU 39 moves to step S7.

In step S7, the CPU 39 displays the expression "REC HOLD" in the LCD 6, as shown in FIG. 12, to indicate that the sound recording is being continued. Then the CPU 39 moves to step S20 to determine whether the sound recording switch 12 is released. As a result, if the sound recording switch is continuously pressed (NO), the CPU 39 returns to step S20 and repeats the same process until the sound recording switch 12 is released. If the sound recording switch 12 has been released (YES), the CPU 39 moves to step S9.

In step S9, the sound recording process is ended. More particularly, the CPU 39 sends control signals to the A/D and D/A conversion circuit 42 to end the A/D conversion process of sound signals, and stops the storage process of sound data to the memory card 24. Then the CPU 39 moves to step S10 and ends the process by displaying the expression "REC STOP" in the LCD 6, as shown in FIG. 13 (END).

In a process such as the one described above, if the release button 10 is pressed, shooting is executed and the sound recording process is started, which ends automatically after 10 seconds. If the sound recording switch 12 is pressed during the 10 seconds between the start of the sound recording and the automatic completion of the sound recording, the decision in step S6 is determined to be YES, and sound recording continues until the sound recording switch 12 is released. Hence, the sound recording time may be changed freely as in the case of the previous example.

If the release switch 10 is operated and shooting is executed in the two processes referred to above, sound recording is automatically executed for 10 seconds. Therefore, if an unexpected situation arises and execution of shooting of an image becomes necessary again during the processing of the sound recording, it becomes necessary to stop the sound recording process by the operation of the sound recording switch 12, which is independent of the shooting process (the operation is needed twice in the process of FIG. 10, and once in the process of FIG. 14). Hence, in order to improve upon such a situation, the sound recording process may be interrupted by the operation of the release switch 10.

Figure 15:
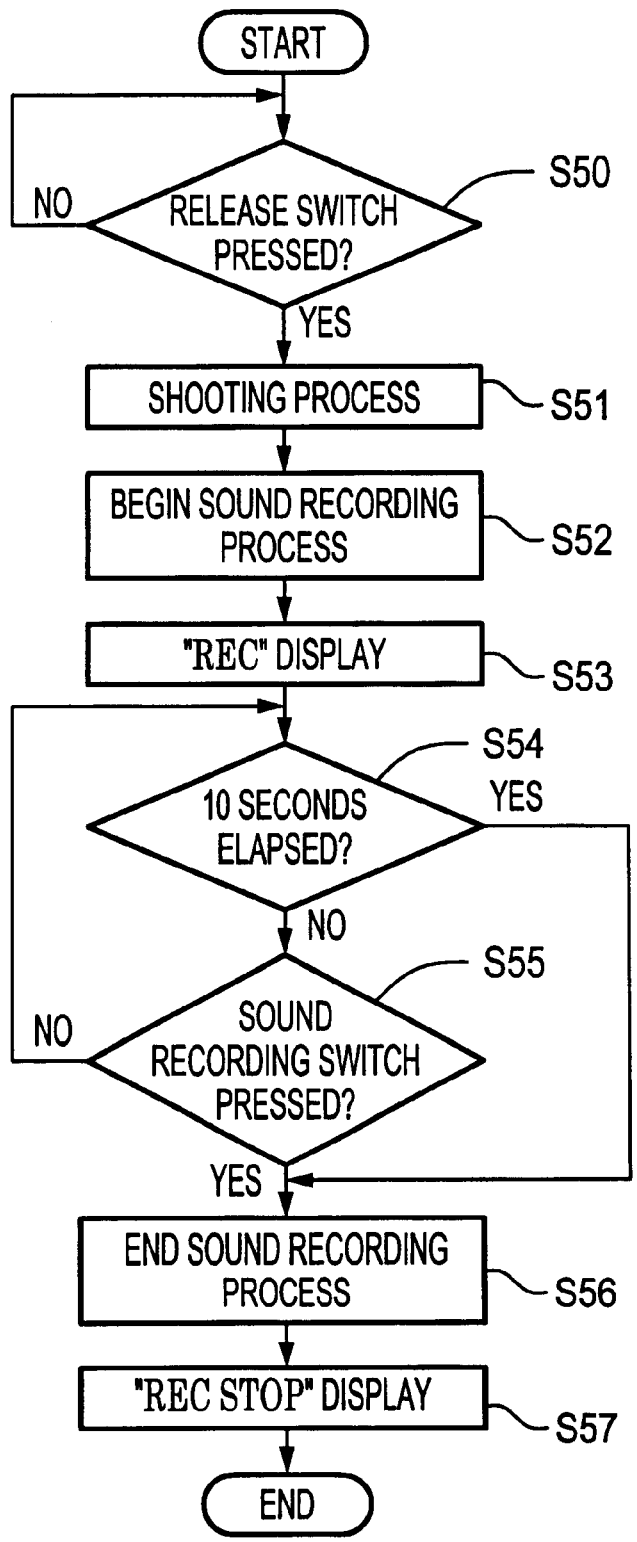
FIG. 15 is a flow chart of a process that is executed in yet another embodiment of the invention.

FIG. 15 is an example of a flow chart to execute such an operation. In this case, a similar supply format as in the example described previously may be adopted for this program. Upon execution of this process, the CPU 39 determines in step S50 whether the release switch 10 is pressed. As a result, if the release switch is not pressed (NO), the CPU 50 returns to step S50 and repeats the same process until the release switch 10 is pressed. If the release switch 10 is pressed (YES), the CPU 39 moves to step S51.

In step S51, the shooting process is executed. In other words, the CPU 39 stores the image that is input from the CCD 20, and on which a predetermined process is executed by the image processing unit 31, A/D conversion circuit 32 and the DSP 33 in the shooting image recording area of the memory card 24.

In the subsequent step S52, the sound recording process is started. The sound signals which are output from the microphone 8 are converted to digital signals by the A/D and D/A conversion circuit 42 and are stored successively in the sound recording area of the memory card 34.

When the sound recording process is started and storing of digitized sound is started in step S52, the CPU 39 moves to step S53, and the expression "REC" is displayed on the upper left corner of the screen in the LCD 6.

Next, in step S54, the CPU 39 determines whether 10 seconds have elapsed since shooting is executed. As a result, if 10 seconds have elapsed since the execution of shooting (YES), the CPU 39 moves to step S56. If 10 seconds have not elapsed since execution of shooting, the CPU 39 moves to step S55.

In step S55, the CPU 39 determines whether the release switch 10 (which is also acting as the sound recording switch) is pressed again. As a result, if the release switch 10 is not pressed again (NO), the CPU 39 returns to step S54 and repeats the same process as with the previous case. If the release switch 10 is pressed again (YES), the CPU 39 moves to step S56.

In step S56, the sound recording process is ended. In fact, the operation of the A/D and D/A conversion circuit 42 is stopped and the data storage process for the memory card 24 is also stopped.

In the following step S57, the expression "REC STOP" is displayed in the upper left corner of the screen in the LCD 6, as shown in FIG. 13, and the process is ended (END).

In the process described above, upon pressing the release switch 10, shooting is executed and the sound recording process is started with recording automatically being stopped when 10 seconds have elapsed. If, for example, a need arises to execute shooting again before elapse of 10 seconds since the execution of the first shooting due to the occurrence of an unexpected situation, pressing the release switch 10 once will interrupt the sound recording and the shooting mode is enabled immediately.

It is clear that pressing the release switch 10 during recording may be made to execute shooting as well as to stop the sound recording process.

In an information processing apparatus according to a preferred embodiment of the invention, and in a recording medium encoded with a program for controlling an information processing apparatus according to a preferred embodiment of the invention, when a first control member is operated, a still image is recorded, and sound is recorded after the operation of the first control member. Operation of a second control member is detected, and if the operation of the second control member is detected to have been within a predetermined time after the operation of the first control member, the recording time of the sound may be changed as a function of the operation of the second control member. Thus, a change of the recording time may be enabled with a simple operation.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An information processing apparatus for recording sound and image information, comprising:
    means for outputting a first control signal,
    means for outputting a second control signal,
    still image recording means for recording a still image when said first control signal is output,
    sound recording means for recording sound for only a predetermined time after the output of said first control signal,
    detection means for detecting an output of said second control signal during said predetermined period of time; and
    recording time extension means extending for the predetermined recording time of said sound recording when the output of said second control signal is detected by said detection means during said predetermined period of time, said recording time extension means extending said predetermined sound recording time as a function of the output of said second control signal.

2. The information processing apparatus of claim 1, wherein said recording time extension means keeps recording sound by said sound recording means in a continuous state when said second control signal is detected by said detection means to have been output once within said predetermined time after the output of said first control signal, and
    ends the recording of sound by said sound recording means when said second control signal is detected by said detection means to have been output for a second time.

3. The information processing apparatus of claim 2, wherein said first control signal is output by an image recording switch and said second control signal is output by a sound recording switch.

4. The information processing apparatus of claim 2, wherein both said first and said second control signals are output by an image recording switch.

5. The information processing apparatus of claim 1, wherein said recording time extension means keeps recording sound by said sound recording means in a continuous state when said second control signal is detected by said detection means to have been output once within said predetermined time after the output of said first control signal, and
    ends recording of sound by said sound recording means when said output of said second control signal is detected by said detection means to have been halted.

6. The information processing apparatus of claim 5, wherein said first control signal is output by an image recording switch and said second control signal is output by a sound recording switch.

7. The information processing apparatus of claim 5, wherein both said first and said second control signals are output by an image recording switch.

8. The information processing apparatus of claim 1, wherein said first control signal is output by an image recording switch and said second control signal is output by a sound recording switch.

9. The information processing apparatus of claim 1, wherein both said first and said second control signals are output by an image recording switch.

10. The information processing apparatus according to claim 1, wherein said apparatus is an electronic camera.

11. A recording medium for use in an information processing apparatus that is capable of recording sound and image information, said recording medium being encoded with a computer-readable control program causing said information processing apparatus to:

record a still image when a first control signal is provided, record a sound for a predetermined time after the provision of said first control signal, detect the provision of a second control signal during said predetermined period of time; and when the provision of said second control signal is detected within said predetermined time after provision of said first control signal, extend said predetermined sound recording time as a function of the provision of said second control signal during said predetermined period of time.

12. The recording medium of claim 11, wherein said control program causes continuous recording of sound by said information processing apparatus when said second control signal is detected to have been provided once within said predetermined time after the provision of said first control signal, and ends the recording of sound when said second control signal is detected to have been provided for a second time.

13. The recording medium of claim 11, wherein said control program causes continuous recording of sound by said information processing apparatus when said second control signal is detected to be continuously provided within said predetermined time after the provision of said first control signal, and ends the recording of sound when the provision of said second control signal is detected to be stopped.

14. The recording medium of claim 11, wherein said first control signal is a signal output by an image recording switch, and said second control signal is a signal output by a sound recording switch.

15. The recording medium of claim 11, wherein said first and second control signals are signals output by an image recording switch.

16. A method of recording sound and image information with an information processing apparatus, said method including the steps of:

recording a still image when a first control signal is provided;

recording sound for a predetermined period of time after said provision of said first control signal;

detecting provision of a second control signal during said predetermined period of time; and extending said predetermined period of time as a function of the provision of said second control signal detected during said detecting step.

17. The method according to claim 16, wherein sound is recorded continuously during said sound recording step until said second control signal is detected to have been provided twice.

18. The method according to claim 16, wherein sound is recorded continuously during said sound recording step until said provision of said second control signal is detected to have ceased.

19. An information processing apparatus for recording sound and image information, comprising:

a first control member and a second control member, an image recorder operated by said first control member to record an image, a sound recorder that records sound for a predetermined period of time after operation of said first control member, a detector that detects operation of said second control member during said predetermined period of time; and a controller which extends a sound recording time from said predetermined period of time in respect to said detector detecting an operation of said second control member during said predetermined period of time.

20. The information processing apparatus according to claim 18, wherein:

said controller causes said sound recorder to record sound continuously after said detector detects a first operation of said second control member within said predetermined period of time and ends said recording of sound by said sound recorder when said detector detects a second operation of said second control member.

21. The information processing apparatus according to claim 19, wherein:

said controller causes said sound recorder to record continuously after said detector detects a first operation of said second control member within said predetermined period of time; and ends said recording of sound by said sound recorder when said detector detects that said first operation of said second control member has ended.

22. The information processing apparatus according to claim 19, wherein:

said first control member comprises an image recording switch and said second control member comprises a sound recording switch.

23. The information processing apparatus according to claim 19, wherein:

both said first and second control members comprise an image recording switch.

* * * * *